June 16, 1959 W. H. RICKARD 2,890,842
SPOOL FOR FISHING REEL
Filed Nov. 26, 1956

INVENTOR.
WILLIAM H. RICKARD
BY
*Edwards*
ATTORNEYS

United States Patent Office 2,890,842
Patented June 16, 1959

2,890,842

SPOOL FOR FISHING REEL

William H. Rickard, Boulder, Colo.

Application November 26, 1956, Serial No. 624,379

10 Claims. (Cl. 242—118.4)

This invention relates generally to a spool for holding a line, such as a fishing line, thereon, and more particularly to a spool which is arranged to direct the separate loops of a line being wound thereon in a position to cross at least one loop already in position on the spool.

In most fishing reels a rather elaborate mechanism is provided for "level winding" the line on the spool. One of the features of the so-called level-winding spool is the fact that as an individual loop of the line is placed on the spool it is placed at an angle to a perpendicular plane through the spool so that the individual loop must cross at least one loop already in place on the spool. Unless the line is placed so as to cross a loop already in place on the spool, when tension is applied on the line leading from the spool, line will wedge between the loops on the spool, and under certain circumstances become so tightly wedged in the loops that considerable time is required to release the line from the loops. In spinning reels, and especially for open spool spinning reels, a cam is provided so that the spool moves toward or away from the reel body as line pick-up bale is rotated around the spool to loop the thread on the spool. This reciprocal motion of the spool crosses the loops being placed on the spool over the loops in place on the spool. The crossed loops will not permit the line to wedge between loops on the spool and the line will peel easily from the spool. In other types of spinning reels, the pick-up bale may be reciprocal so that it will cross the loops as they are placed on the spool. Other types of reels have similar mechanism for crossing the loops as they are laid on the line on the spool. The mechanisms for causing the loops to cross is expensive, and the increased mechanism of the reel increases the probability of mechanical defects and trouble during operation of the reel.

According to the present invention, I have discovered a spool which automatically crosses the line being placed thereon without extraneous mechanism and without reciprocally moving the spool or the pick-up bale. The spool includes a plurality of projections which direct the line being placed thereon in such a manner that the line must cross the loops already in place on the spool. The spool includes a plurality of projections spaced circumferentially on each end of the spool, and the projections are so placed as to force the line being placed on the spool past the center line of the axial length of the line-holding cylinder of the spool. The spool is very simply and inexpensively manufactured and it is useful in most of the various types of fishing reels currently used. The spool is also effective in reels which utilize either a rotating spool or a stationary spool.

Included among the objects and advantages of the present invention, is an inexpensive and simply-constructed spool which is arranged to automatically cross the loops of a line being wound thereon. The spool of the invention is operable in various types of reels, and the use of the spool in a reel eliminates the necessity of a level-winding mechanism in the reel. The spool of the invention is also useful in reels utilizing either a non-rotating or a rotating spool. The spool is economically constructed and substantially reduces the cost of a fishing reel utilizing the spool. A reel using the spool is effective and efficient for casting and retrieving a fishing line without costly level-winding mechanisms.

These and other objects and advantages of the invention may be readily ascertained by referring to the following description and appended illustrations in which.

Figure 1:
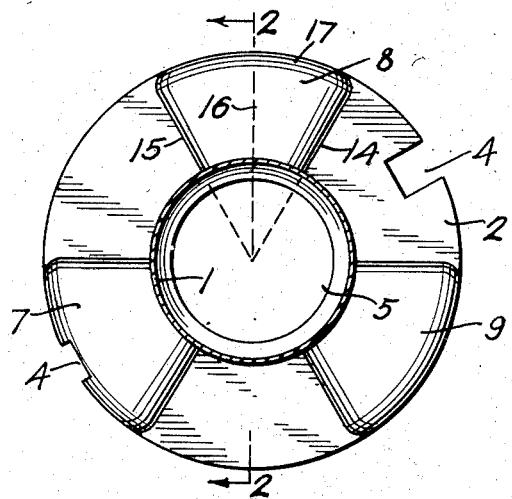
Fig. 1 is a partial sectional view of a spool according to the invention.
Figure 2:
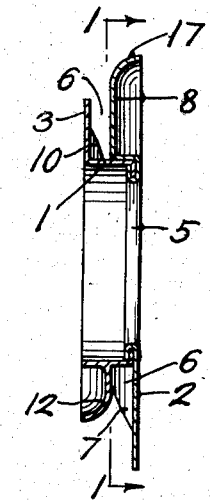
Fig. 2 is a side-elevational view in section of a reel of the invention showing the relation of a line-holding cylinder and the line-directing projections.
Figure 3:
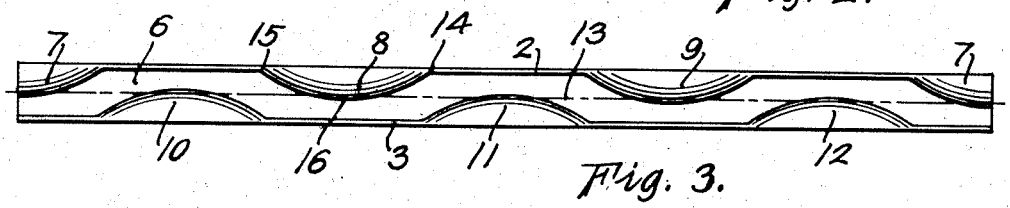
Fig. 3 is a developed section of a spool according to the invention showing the relationship of the projections to the line-carrying spool.
Figure 4:
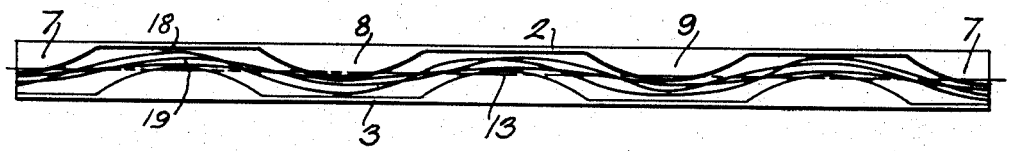
Fig. 4 is a developed section of the spool showing the line-directing projections with two crossed loops of a line placed thereon.

In the device illustrated in Figs. 1 and 2, a spool for holding a line comprises a line-holding cylinder 1 which has secured thereto a back plate 2, which is a radial flange, and a front plate 3, which likewise is a radial flange. The spool illustrated in Figs. 1 and 2 is a spool which is useful for a spinning reel having a stationary spool and a rotating pick-up bale or pin, which is well known in the art. The back plate 2 includes positioning notches 4 diametrically opposed to each other at the outer edge thereof which are arranged to fit in the projections in the reel for holding the spool stationary. A folded flange 5 is used for assembling the spool. The back plate 2 is substantially of larger diameter than the front plate 3 since the front plate is the plate over which the line peels in casting. The line loops around the cylinder 1 and lies in the space 6, Fig. 2, between the front plate and the back plate. The back plate includes three projections 7, 8 and 9 symmetrically placed therearound, and they extend from the cylinder 1 to the outer peripheral edge of the plate 2. The front plate likewise contains three projections 10, 11 and 12 symmetrically placed therearound as shown in the developed section in Fig. 3. Each of the projections on the back plate is smoothly curved from the outer peripheral edge down around the inner edge thereof, and each projection extends to or beyond the center line 13 of the cylinder 1 as shown in Fig. 3. For convenience one projection will be described which is substantially the same for all the other projections. The projection 8 includes sides 14 and 15 which extend outwardly on a radius of the spool. The edges smoothly join the back plate 2. The projection 8 arcs from side to side, and the major arcuate dimension of the projection is along the centerline 16 of the projection. The top 17 of the projection is smoothly curved into the front portion of the projection so that there are no corners or hooks to catch a line passing thereover. All the surfaces of the projections are smooth so that the line will fall easily over the projections without snagging onto the line-holding cylinder. Each of the projections extends to or beyond the centerline 13 of the line-holding cylinder so that a line being wound on the spool must assume a winding route therearound. As the line slides down along a projection, it must cross at least one loop of the line already in place on the cylinder 1. As illustrated in Fig. 4, a loop 18 is placed on the spool and takes a circuitous route, being forced to cross the centerline 13 of the line-holding cylinder. A second loop 19 placed on the spool also takes a circuitous route and as the line falls down along each of the projections it crosses the centerline and it crosses the first loop 18 already on the cylinder. This continues as each loop is passed onto the cylinder and each new loop crosses one or more of the loops already in place on the cylinder. Since the loops cross the loops already on the cylinder, tension on the line will not pull it between the loops on the cylinder; therefore, the line will not foul.

In the spool, shown in cross section in Fig. 2, the back plate is folded under at 5 over a radial projection on the cylinder 1, and the parts are held together. The outer edge of the cylinder 1 is folded back and radially to form the front plate 3. The projections in the form shown are stamped in the plates, i.e., the projections or bulges 7, 8 and 9 are stamped in the back plate 2. The projections 10, 11, and 12 are stamped in the front plate 3. Where it is not possible or not desired to stamp the flanges of a spool, the projections may be separately made and then mounted on the two end plates of the spool at the various desired spacings. With the sheet metal spool, such as used in spinning reels, however, the projections are readily stamped in the metal of the end plates which leaves no corners or projections which will snag the line being wound on the spool or being withdrawn therefrom. Since the line will touch each of the projections, due to the projections extending to or layout centerline, as it is being wound on the spool, it is important that there be no corners or projections to snag or hook the line since such snags will prevent proper operation of the spool.

Figure 5:
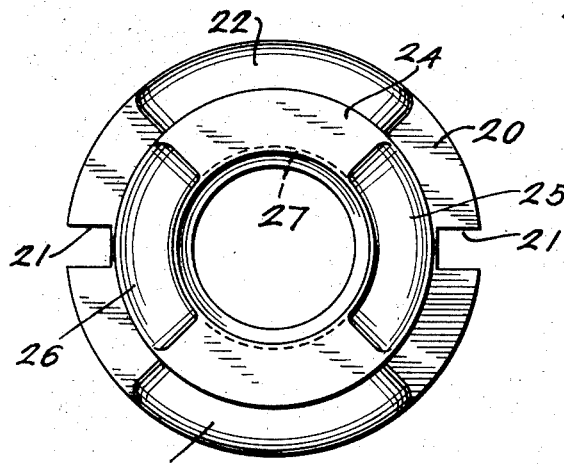
Fig. 5 is a modified spool according to the invention utilizing four line-directing projections thereon.

In the modification of Fig. 5, a spool includes a back plate 20 having positioning notches 21 in the peripheral edge thereof and a pair of diametrically-opposed projections 22 and 23. The front plate 24 of the spool includes diametrically-opposed projections 25 and 26. The projections on the back plate extend circumferentially approximately 90 degrees of the back plate, and the projections on the front plate extend approximately 90 degrees but in a quadrant 90 degrees out of phase with the projections of the back plate. In this manner, there are four projections around the 360 degrees of the line-carrying cylinder 27. In this case, the projections extend to or beyond the centerline of the line-carrying cylinder so that any line being wound on the spool must take a circuitous route therearound and will cross the loops of the line already in place on the spool. As in the case of the device illustrated in Fig. 1, the projections are radial and all surfaces and corners of the projections are smooth so that it will not snag the line being placed on or taken off the spool.

While the invention has been illustrated by reference to a specific device, there is no intent to limit the spirit or the scope of the invention to the precise details so set forth except insofar as defined in the following claims.

I claim:

1. A spool for a fishing reel comprising a rotary member having two outer disc portions and a cylindrical portion interconnecting said discs for conjoint rotation, the cylindrical portion being of substantially lesser diameter than said discs, each disc having a plurality of circumferentially spaced radial projections extending from the cylindrical portion to the periphery of the disc and having a convex surface merging with said periphery, the maximum thickness of said projections being greater than one-half the distance between said discs, and the spacing of said projections positioning a projection on one disc opposite a flat surface on the other disc in alternate circumferential arrangement so as to provide a sinuous line-receiving annular recess in the spool.

2. A spool according to claim 1 in which there are two radially-directed projections extending diametrically opposite each other on each said flange.

3. A spool according to claim 1 in which there are three equi-spaced radially-directed projections on each said flange.

4. A spool according to claim 1 in which there are two radially-directed projections extending diametrically opposite each other on each said flange, said projections extending circumferentially about 90 degrees, and each set of projections on one flange being spaced 90 degrees from the set on the other flange.

5. A spool as defined in claim 1 in which each said disc has two radial projections.

6. A spool for a fishing reel comprising a cylindrical base and a pair of spaced-apart radial flanges arranged to hold the coils of a line therebetween, at least two radially-directed projections mounted on each flange and extending from said cylinder to the periphery of each flange, said projection being of substantial circumferential width and having a smooth arcuate surface from its intersection on one side with the surface of the flange to the opposite side thereof so as to provide a snagless area for a line to follow, each said projection extending axially from its adjacent flange to at least the center line of a cylindrical base between said flanges, the projections on each flange being directed outwardly and diametrically opposite each other, and the outer edge of said projections being smoothly curved and joined to the periphery of its adjacent flange.

7. A spool for a fishing reel comprising a cylindrical base and a pair of spaced-apart radial flanges arranged to hold the coils of a line therebetween, three equally-spaced, radially-directed projections mounted on each flange and extending from said cylinder to the periphery of each flange, said projection being of substantial circumferential width and having a smooth arcuate surface from its intersection on one side with the surface of the flange to the opposite side thereof so as to provide a snagless area for a line to follow, each said projection extending axially from its adjacent flange to at least the center line of said cylinder between said flanges, the projections on each flange being opposed to the spaces between the projections on the opposite flange and the outer edge of said projections being smoothly curved and joined to the periphery of its adjacent flange.

8. A spool for a fishing reel comprising a rotary member having two outer disc portions and a cylindrical portion interconnecting said discs for conjoint rotation, the cylindrical portion being of substantially lesser diameter than said discs, each disc having a plurality of circumferentially spaced radial projections extending from the cylindrical portion to the periphery of the disc and having declining sides and a convex surface merging with said periphery, the maximum thickness of said projections being greater than one-half the distance between said discs, and the spacing of said projections positioning a projection on one disc opposite a flat surface on the other disc in alternate circumferential arrangement so as to provide a sinuous line-receiving annular recess in the spool.

9. A spool according to claim 8 in which there are a pair of opposed projections on each of said flanges, and each pair of projections are circumferentially offset from the other pair of projections.

10. A spool for a fishing reel comprising a rotary member having two outer disc portions and a cylindrical portion interconnecting said discs for conjoint rotation, the cylindrical portion being of substantially lesser diameter than said discs and one disc being of greater diameter than the other, each disc having a plurality of circumferentially spaced radial projections extending from the cylindrical portion to the periphery of the disc and having a convex surface merging with said periphery, the maximum thickness of said projections being greater than one-half the distance between said discs, and said disc of larger diameter having means for its attachment to a reel, and the spacing of the projections positioning a projection on one disc opposite a flat surface on the other disc in alternate circumferential arrangement so as to provide a sinuous line-receiving annular recess in the spool.

References Cited in the file of this patent

FOREIGN PATENTS 1,783     Great Britain _____ of 1887